US010280889B2

(12) United States Patent
Gentry et al.

(10) Patent No.: US 10,280,889 B2
(45) Date of Patent: May 7, 2019

(54) MOTOR VEHICLE SOLENOID FOR A STARTER MOTOR

(71) Applicant: REMY TECHNOLOGIES, L.L.C., Pendleton, IN (US)

(72) Inventors: Ronald D. Gentry, Cicero, IN (US); Muhammed Emin Ozdemir, Noblesville, IN (US); Steve Burton, Anderson, IN (US); Kirk Neet, Pendleton, IN (US)

(73) Assignee: BORGWARNER INC., Auburn Hills, MI (US)

( * ) Notice: Subject to any disclaimer, the term of this patent is extended or adjusted under 35 U.S.C. 154(b) by 611 days.

(21) Appl. No.: 14/742,901

(22) Filed: Jun. 18, 2015

(65) Prior Publication Data

US 2015/0369196 A1 Dec. 24, 2015

Related U.S. Application Data

(60) Provisional application No. 62/013,790, filed on Jun. 18, 2014.

(51) Int. Cl.

| | |
|---|---|
| ***F02N 11/08*** | (2006.01) |
| ***H01F 7/16*** | (2006.01) |
| ***H02K 11/00*** | (2016.01) |
| ***H02K 5/04*** | (2006.01) |
| ***H02K 7/20*** | (2006.01) |
| ***F02N 15/00*** | (2006.01) |
| ***F02N 15/06*** | (2006.01) |

(52) U.S. Cl.

CPC ............ *F02N 11/08* (2013.01); *F02N 11/087* (2013.01); *F02N 15/006* (2013.01); *F02N 15/067* (2013.01); *H01F 7/1607* (2013.01)

(58) Field of Classification Search

CPC ...... F02N 11/08; F02N 11/087; F02N 15/006; F02N 15/067; H01F 7/1607

USPC ..................... 123/179.24; 335/255, 256, 299

See application file for complete search history.

(56) References Cited

U.S. PATENT DOCUMENTS 3,215,902 A * 11/1965 Foley .................... H01F 7/1607 251/129.15
3,870,931 A * 3/1975 Myers .................. G05D 3/1409 318/599
4,117,821 A * 10/1978 Kawai ................. F02N 11/0851 123/179.16
7,690,343 B2 * 4/2010 Doljack .............. F02N 11/0866 123/179.25
8,171,908 B2 * 5/2012 Senda ................. F02N 11/0844 123/179.4
8,590,500 B2 * 11/2013 Notani ................ F02N 11/0844 123/179.25

(Continued)

*Primary Examiner* — David E Hamaoui
*Assistant Examiner* — Susan E Scharpf
(74) *Attorney, Agent, or Firm* — Cantor Colburn LLP

(57) ABSTRACT

A motor vehicle solenoid includes a solenoid housing having an inner surface, at least one coil arranged in the housing, an actuator associated with the at least one coil, and a stop member arranged in the housing adjacent the at least one coil. The stop member includes an outer circumferential edge abutting the inner surface of the solenoid housing. The outer circumferential edge includes at least one clearance zone that is spaced from the inner surface of the housing. The at least one clearance zone defines a grounded electrical attachment surface.

15 Claims, 3 Drawing Sheets

(56) References Cited

U.S. PATENT DOCUMENTS

| | | | | |
|---|---|---|---|---|
| 2011/0273250 | A1* | 11/2011 | Plaideau | H01H 51/065<br>335/126 |
| 2015/0369194 | A1* | 12/2015 | Ozdemir | H01F 7/08<br>123/179.28 |

* cited by examiner

MOTOR VEHICLE SOLENOID FOR A STARTER MOTOR

CROSS-REFERENCE TO RELATED APPLICATION

This application is a non-provisional of U.S. Provisional Patent Application No. 62/013,790 filed on Jun. 18, 2014, the disclosure of which is incorporated herein by reference in its entirety.

BACKGROUND OF THE DISCLOSURE

Exemplary embodiments pertain to the art of motor vehicles and, more particularly, to a motor vehicle solenoid for a starter motor.

Internal combustion engines generally include a starter motor. The starter motor is electrically energized to initiate operation of the internal combustion engine. A typical starter includes a starter motor that generates torque that is passed to a pinion gear and a solenoid. The solenoid shifts the pinion gear into engagement with a ring gear on the internal combustion engine. Once engaged, the starter motor rotates the pinion to spin the ring gear and initiate operation of the internal combustion engine. The solenoid may include various electronic components that cooperate to shift the pinion gear into engagement with the ring gear.

BRIEF DESCRIPTION OF THE DISCLOSURE

Disclosed is a motor vehicle solenoid including a solenoid housing having an inner surface, at least one coil arranged in the housing, an actuator associated with the at least one coil, and a stop member arranged in the housing adjacent the at least one coil. The stop member includes an outer circumferential edge abutting the inner surface of the solenoid housing. The outer circumferential edge includes at least one clearance zone that is spaced from the inner surface of the housing. The at least one clearance zone defines a grounded electrical attachment surface.

Also disclosed is an internal combustion engine including an engine block, a ring gear mounted relative to the engine block, and a starter motor mounted to the engine block at the ring gear. The starter motor includes a motor housing, a pinion housing and a solenoid mounted relative to one of the motor housing and the pinion housing. The solenoid includes a solenoid housing having an inner surface, at least one coil arranged in the housing, an actuator associated with the at least one coil, and a stop member arranged in the housing adjacent the at least one coil. The stop member includes an outer circumferential edge abutting the inner surface of the solenoid housing. The outer circumferential edge includes at least one clearance zone that is spaced from the inner surface of the housing. The at least one clearance zone defines a grounded electrical attachment surface.

Further disclosed is a motor vehicle starter motor including a motor housing, a pinion housing, and a solenoid mounted relative to one of the motor housing and the pinion housing. The solenoid includes a solenoid housing having an inner surface, at least one coil arranged in the housing, an actuator associated with the at least one coil, and a stop member arranged in the housing adjacent the at least one coil. The stop member includes an outer circumferential edge abutting the inner surface of the solenoid housing. The outer circumferential edge includes at least one clearance zone that is spaced from the inner surface of the housing. The at least one clearance zone defines a grounded electrical attachment surface.

BRIEF DESCRIPTION OF THE DRAWINGS

The following descriptions should not be considered limiting in any way. With reference to the accompanying drawings, like elements are numbered alike.

DETAILED DESCRIPTION OF THE DISCLOSURE

A detailed description of one or more embodiments of the disclosed apparatus and method are presented herein by way of exemplification and not limitation with reference to the Figures.

Figure 1:
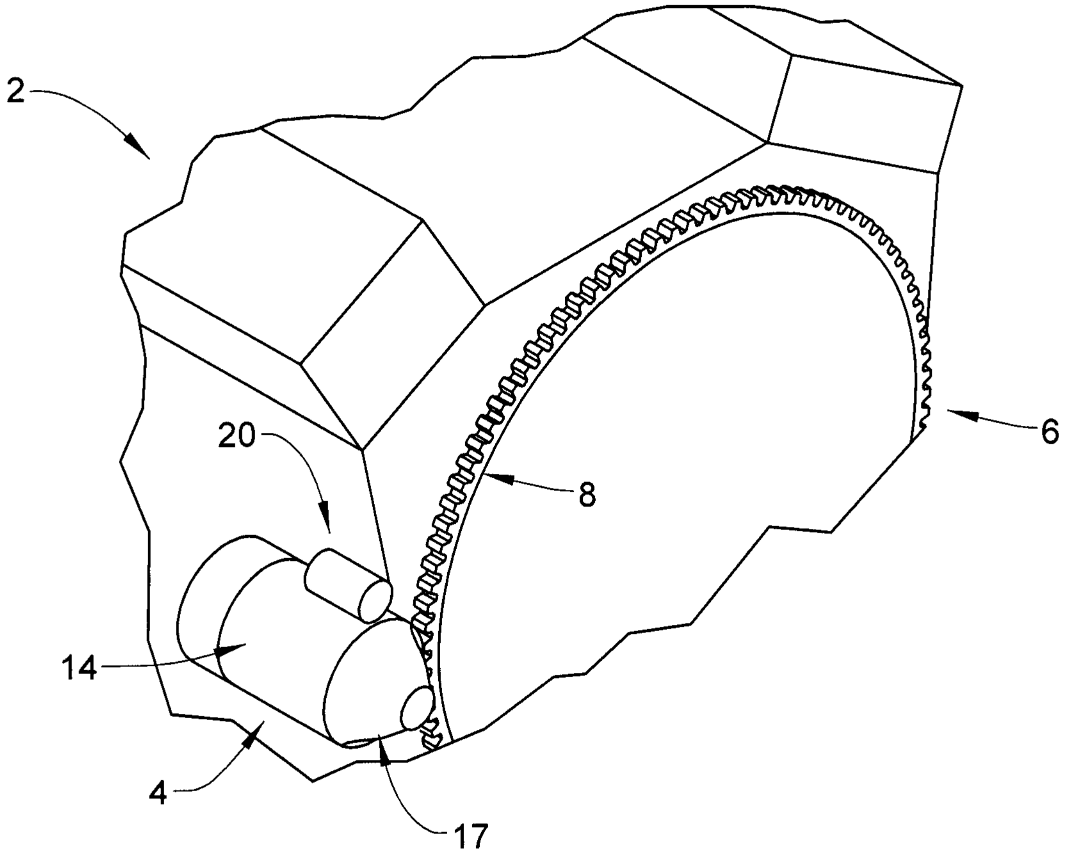
FIG. 1 depicts an internal combustion engine including a starter motor having a solenoid, in accordance with an exemplary embodiment.

An internal combustion engine, in accordance with an exemplary embodiment, is indicated generally at 2, in FIG. 1. Internal combustion engine 2 includes a starter motor 4 and a ring gear 6 having a plurality of ring gear teeth 8. Specifically, starter motor 4 engages and rotates ring gear 6 to initiate operation of internal combustion engine 2. Starter motor 4 may include a motor housing 14 and a nose or pinion housing 17. Of course, it should be understood that starter motor 4 may also be provided with a single or unitary housing. A solenoid 20 is shown operably coupled to motor housing 14 in accordance with an aspect of an exemplary embodiment. However, solenoid 20 could also be operably connected to pinion housing 17 if so provided. Starter motor 4 includes an output shaft (not shown) that supports an overrun clutch and a pinion gear (also not shown) that selectively engages with ring gear 6.

Figure 2:
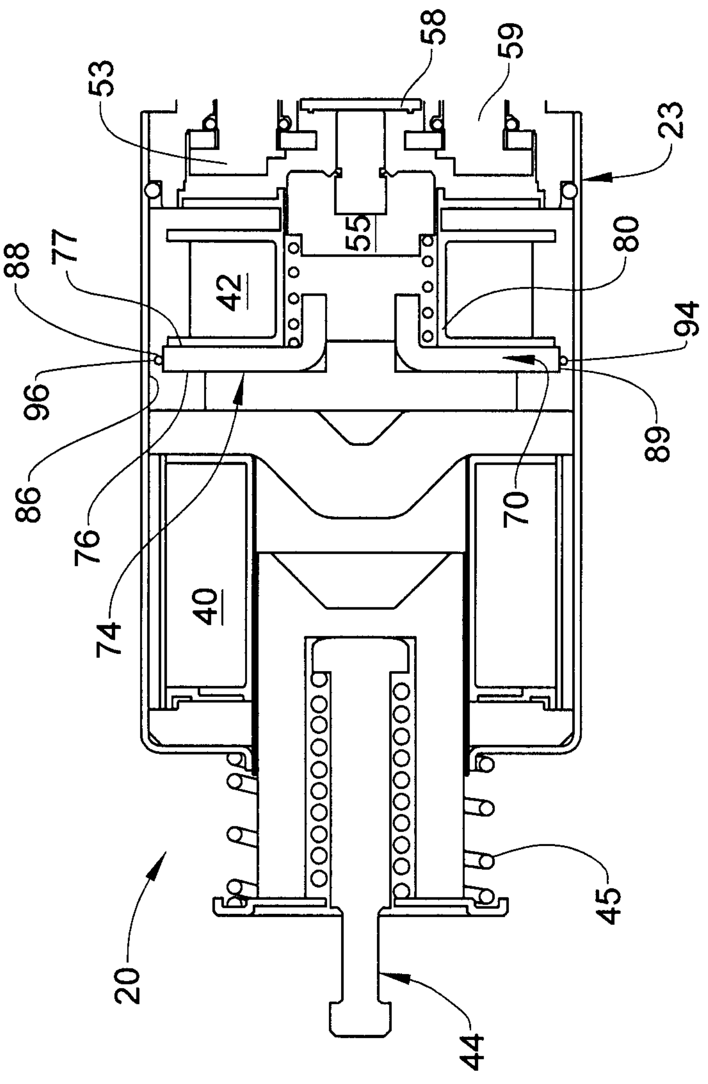
FIG. 2 depicts a partial cross-sectional view of the solenoid of FIG. 1.

As shown in FIG. 2, solenoid 20 includes a housing 23 that surrounds first and second coils 40 and 42 and an actuator assembly 44. Actuator assembly 44 is operably coupled to a lever (not shown) and includes a return spring 45. Electrical energy passing through switch terminals (not shown) energizes one or more of coils 40 and 42. Coil 40 creates a magnetic flux that draws in actuator assembly 44 causing the lever to shift the pinion gear along the output shaft and into engagement with ring gear 6, as will be detailed more fully below. Second coil 42 includes an actuator 55 that establishes a flow of electrical energy from a terminal 53, through a contact 58 and to another terminal 59 causing starter motor 4 to be energized and the pinion gear to rotate.

Figure 3:
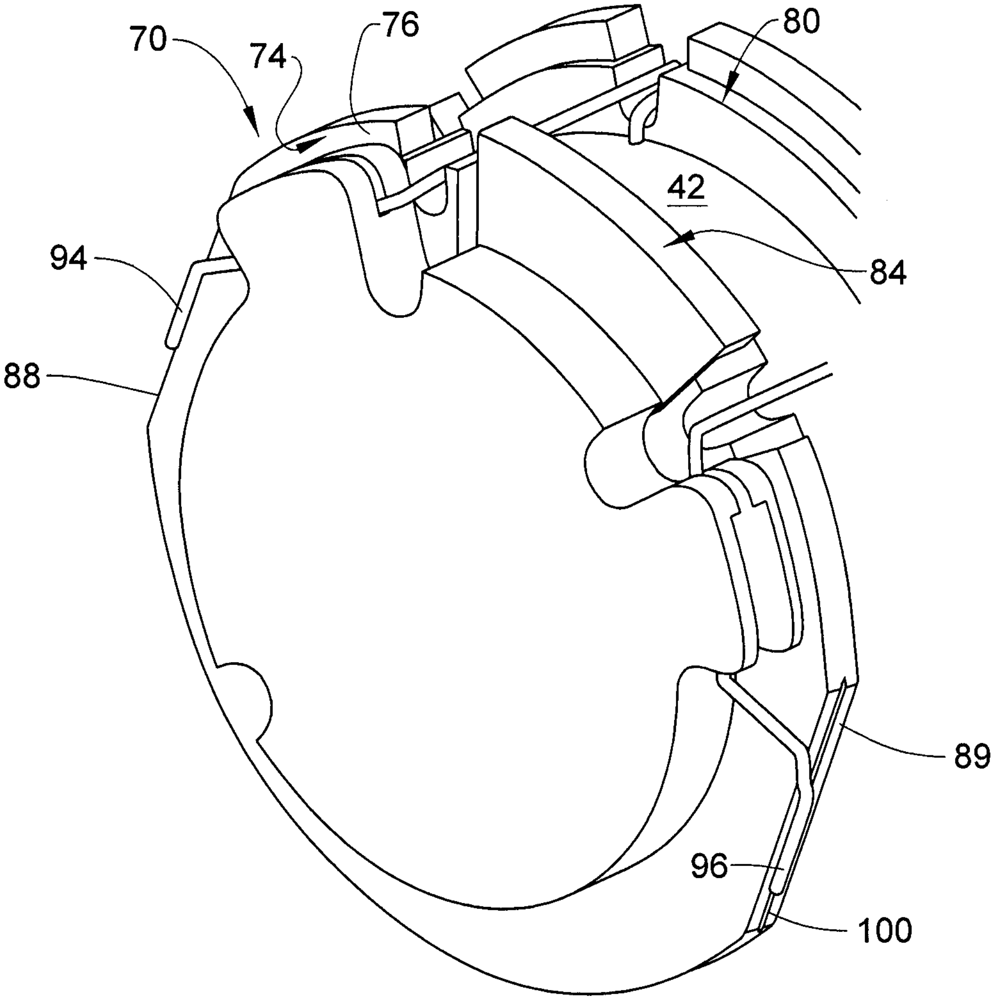
FIG. 3 depicts a partial perspective view of an end plate of the solenoid of FIG. 2.

In accordance with an exemplary embodiment, solenoid 20 includes a stop member 70 arranged adjacent to second coil 42. Stop member 70 defines a travel limiter for actuator 55. In the exemplary embodiment shown illustrated in FIG. 3, stop member 70 includes a body 74 formed from an electrically conductive material. Body 74 includes a first axial surface 76 and a second axial surface 77. Second axial surface 77 abuts a spool 80 that supports second coil 42. Body 74 also includes an outer circumferential edge 84, a portion of which contacts an inner surface 86 of housing 23 establishing an electrical ground. Circumferential edge 84 includes a first clearance zone 88 and a second clearance zone 89 that are spaced from inner surface 86. Fclearance zones 88 and 89 create a clearance between the circumferential edge 84 and housing 23. The clearance allows for an electrical connection of a diode (not shown). The clearance zones 88 and 89 may be formed on the outer circumferential edge 84 and may take on a variety of forms including a flat area such as shown, or a cavity having a rectangular or curved shape. First clearance zone 88 may be spaced 180-degrees from second clearance zone 89. First and second clearance zones 88 and 89 establish an electrical connection surface for a first diode lead 94 and a second diode lead 96 respectively.

Diode leads 94 and 96 may be electrically connected, typically welded, to clearance zones 88 and 89. Diode leads 94 and 96 receive an electrical ground through stop member 70 and thereby define ground leads of the diodes after being connected to the clearance zones 88 and 89. First and second diode leads 94 and 96 are associated with first and second diodes (not shown) provided in solenoid 20. Diode leads 94 and 96 may be formed, such as through bending, and routed so as to lay parallel to first axial surface 76 in accordance with an aspect of an exemplary embodiment. The parallel routing increases an overall available weld area of diode leads 94 and 96 to the clearance zones 88 and 89 to reduce stress concentrations. Of course, diode leads 94 and 96 may be routed at an angle to first axial surface 76. Further, clearance zones 88 and 89 may be provided with a corresponding recess, shown at 100 on clearance zone 89, that may establish a desired alignment and retention of leads 94 and 96 during an attachment process.

At this point it should be understood that the exemplary embodiments illustrate a solenoid for a motor vehicle starter motor having a stop member that includes an inner circumferential surface having at least one clearance zone. The at least one clearance zone is spaced from the inner circumferential surface to provide a grounded attachment surface for an electrical component lead. While shown as including two clearance zones, it should be understood that the number and relative location of clearance zones may vary.

While the disclosure is provided in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that the exemplary embodiment(s) may include only some of the described exemplary aspects. Accordingly, the disclosure is not to be seen as limited by the foregoing description, but is only limited by the scope of the appended claims.

What is claimed is:

1. A motor vehicle solenoid comprising:

a solenoid housing having an inner surface;

at least one coil arranged in the housing;

an actuator associated with the at least one coil;

a stop member arranged in the housing adjacent the at least one coil, the stop member including an outer circumferential edge abutting the inner surface of the solenoid housing, the outer circumferential edge including at least one clearance zone that is spaced from the inner surface of the housing, the at least one clearance zone defining a grounded electrical attachment surface; and a diode lead extending through the stop member and arranged in the clearance zone between the stop member and the inner surface.

2. The motor vehicle solenoid according to claim 1, wherein the at least one clearance zone includes a first clearance zone and a second clearance zone.

3. The motor vehicle solenoid according to claim 2, wherein the first clearance zone is arranged 180-degrees from the second clearance zone.

4. The motor vehicle solenoid according to claim 1, wherein the clearance zone comprises a flat area formed on the outer circumferential edge.

5. The motor vehicle solenoid according to claim 1, wherein the clearance zone includes at least one recess providing a desired alignment and retention for the diode lead supported at the outer circumferential edge.

6. An internal combustion engine comprising:

an engine block;

a ring gear mounted relative to the engine block;

a starter motor mounted to the engine block at the ring gear, the starter motor including a motor housing, a pinion housing and a solenoid mounted relative to one of the motor housing and the pinion housing, the solenoid comprising:

a solenoid housing having an inner surface;

at least one coil arranged in the housing;

an actuator associated with the at least one coil;

a stop member arranged in the housing adjacent the at least one coil, the stop member including an outer circumferential edge abutting the inner surface of the solenoid housing, the outer circumferential edge including at least one clearance zone that is spaced from the inner surface of the housing, the at least one clearance zone defining a grounded electrical attachment surface; and a diode lead extending through the stop member and arranged in the clearance zone between the stop member and the inner surface.

7. The internal combustion engine according to claim 6, wherein the at least one clearance zone includes a first clearance zone and a second clearance zone.

8. The internal combustion engine according to claim 7, wherein the first clearance zone is arranged 180-degrees from the second clearance zone.

9. The internal combustion engine according to claim 6, wherein the clearance zone comprises a flat area formed in the outer circumferential edge.

10. The internal combustion engine according to claim 6, wherein the clearance zone includes at least one recess providing a desired alignment and retention for the diode lead supported at the outer circumferential edge.

11. A motor vehicle starter motor comprising:

a motor housing; and a solenoid mounted to one of the motor housing, the solenoid comprising:

a solenoid housing having an inner surface;

at least one coil arranged in the housing;

an actuator associated with the at least one coil;

a stop member arranged in the housing adjacent the at least one coil, the stop member including an outer circumferential edge abutting the inner surface of the solenoid housing, the outer circumferential edge including at least one clearance zone that is spaced from the inner surface of the housing, the at least one clearance zone defining a grounded electrical attachment surface; and a diode lead extending through the stop member and arranged in the clearance zone between the stop member and the inner surface.

12. The motor vehicle starter motor according to claim 11, wherein the at least one clearance zone includes a first clearance zone and a second clearance zone.

13. The motor vehicle starter motor according to claim 12, wherein the first clearance zone is arranged 180-degrees from the second clearance zone.

14. The motor vehicle starter motor according to claim 11, wherein the clearance zone comprises a flat area formed in the outer circumferential edge.

15. The motor vehicle starter motor according to claim 11, wherein the clearance zone includes at least one recess providing a desired alignment and retention for the diode lead supported at the outer circumferential edge.

* * * * *